US008832811B2

(12) United States Patent
Horman et al.

(10) Patent No.: US 8,832,811 B2
(45) Date of Patent: Sep. 9, 2014

(54) NETWORK ACCESS CONTROL FOR TRUSTED PLATFORMS

(75) Inventors: Neil R. T. Horman, Carey, NC (US); Eric L. Paris, Raleigh, NC (US)

(73) Assignee: Red Hat, Inc., Raleigh, NC (US)

( * ) Notice: Subject to any disclaimer, the term of this patent is extended or adjusted under 35 U.S.C. 154(b) by 211 days.

(21) Appl. No.: 12/870,539

(22) Filed: Aug. 27, 2010

(65) Prior Publication Data

US 2012/0054843 A1 Mar. 1, 2012

(51) Int. Cl.
*H04L 9/32* (2006.01)
*G06F 21/31* (2013.01)
*H04L 29/06* (2006.01)

(52) U.S. Cl.
CPC ............... *H04L 9/3234* (2013.01); *G06F 21/31* (2013.01); *H04L 63/10* (2013.01); *H04L 63/08* (2013.01)
USPC ...................... 726/7; 713/155; 726/4; 726/27

(58) Field of Classification Search
CPC ....... G06F 21/57; H04L 9/3234; H04L 63/20; H04L 2209/127; H04L 63/08; H04L 63/102; H04L 63/0876
USPC ............................................................ 726/7
See application file for complete search history.

(56) References Cited

U.S. PATENT DOCUMENTS

| 7,886,335 | B1 * | 2/2011 | Chickering et al. | 726/1 |
| 2005/0246552 | A1 * | 11/2005 | Bade et al. | 713/193 |
| 2007/0240197 | A1 * | 10/2007 | Blumenthal et al. | 726/1 |
| 2008/0163340 | A1 * | 7/2008 | Cheeniyil et al. | 726/3 |
| 2008/0295157 | A1 * | 11/2008 | Wong et al. | 726/5 |
| 2010/0115625 | A1 * | 5/2010 | Proudler | 726/27 |

OTHER PUBLICATIONS

"TCG Specification Architecture Overview," Specification Revision 1.4, Trusted Computing Group, Inc., Aug. 2, 2007, pp. 7 and 9.*
Stefan Berger et al, "vTPM: Virtualizing the Trusted Platform Module", 2006, Security '06: 15th USENIX Security Symposium, pp. 305-320.*
Yu-Tso Chen; Studer, A.; Perrig, A., "Combining TLS and TPMs to Achieve Device and User Authentication for Wi-Fi and WiMAX Citywide Networks," Wireless Communications and Networking Conference, 2008. WCNC 2008. IEEE , pp. 2804-2809, Mar. 31, 2008-Apr. 3, 2008.*
"802.1X, IEEE Standard for Local and metropolitan area networks, Port-Based Network Access Control," IEEE Std 802.1X-2004, IEEE Computer Society, Dec. 13, 2004, 179 pages.

(Continued)

*Primary Examiner* — Jason K. Gee
*Assistant Examiner* — Zhimei Zhu
(74) *Attorney, Agent, or Firm* — Lowenstein Sandler LLP

(57) ABSTRACT

In response to a request received at an authentication server from a client to enter a network, the authentication server transmits a network access control (NAC) request to the client using a NAC protocol. The NAC request includes an identifier (ID) identifying a trusted platform (TP) credential that represents integrity of at least a portion of software and hardware configurations of the client. In response to a NAC response from the client, the authentication server compares the first TP credential with a second TP credential stored in a storage associated with the authentication server. The authentication server allows the client to enter the network if the first and second TP credentials are matched; otherwise, the client is prevented from entering the network.

21 Claims, 6 Drawing Sheets

(56) References Cited

OTHER PUBLICATIONS

"Linux Integrity Subsystem," Downloaded from http://linux-ima.sourceforge.net/, Jul. 22, 2010, 6 pages.

Aboba, B. et al., "Extensible Authentication Protocol (EAP)," Network Working Group, Request for Comments: 3748, Standards Track, Jun. 2004, 68 pages.

"TCG Specification Architecture Overview," Specification Revision 1.4, Trusted Computing Group, Inc., Aug. 2, 2007, 54 pages.

* cited by examiner

NETWORK ACCESS CONTROL FOR TRUSTED PLATFORMS

TECHNICAL FIELD

The present invention relates generally to security of networks. More particularly, this invention relates to network access control for trusted platforms.

BACKGROUND

For security purposes, a user of a computer system, such as a notebook computer, is typically required to provide user authentication information to the computer system during a login process and to allow the user access to the computer system only in the event of the authentication information provided by the user matching corresponding authentication information stored in the computer system.

Typically, when a computer enters a network, network access control protocols are utilized to authenticate a user and/or a platform by an authentication entity to determine whether such a user and/or platform are entitled to enter the network. The Institute of Electrical and Electronic Engineers (IEEE) 802 Local Area Network standards provide guidelines for allowing users to physically connect to a network and access basic services provided therein. It has become more evident in recent years that controlled access is a necessity with the large amount of sensitive information that is communicated over networks of virtually any size. Access can be restricted by any number of methods, including user logins and passwords, network identification of a unique identification number embedded within the network interface card, call-back schemes for dial-up access, and others.

A trusted platform module (TPM) for use in computing devices such as personal computers is known. The TPM techniques can be implemented in a variety of platforms including mobile platforms such as notebooks or handheld computing devices. A TPM utilized in a mobile platform is referred to as a mobile TPM. The purpose of a TPM is to provide computer identity and secure services related to transactions, licensing of application and media, protecting user data, and special functions. However, the TPM techniques have not been utilized for authenticating a user and/or platform for network access control purposes.

BRIEF DESCRIPTION OF THE DRAWINGS

The present invention is illustrated by way of example and not limitation in the figures of the accompanying drawings in which like references indicate similar elements.

DETAILED DESCRIPTION

Figure 1:
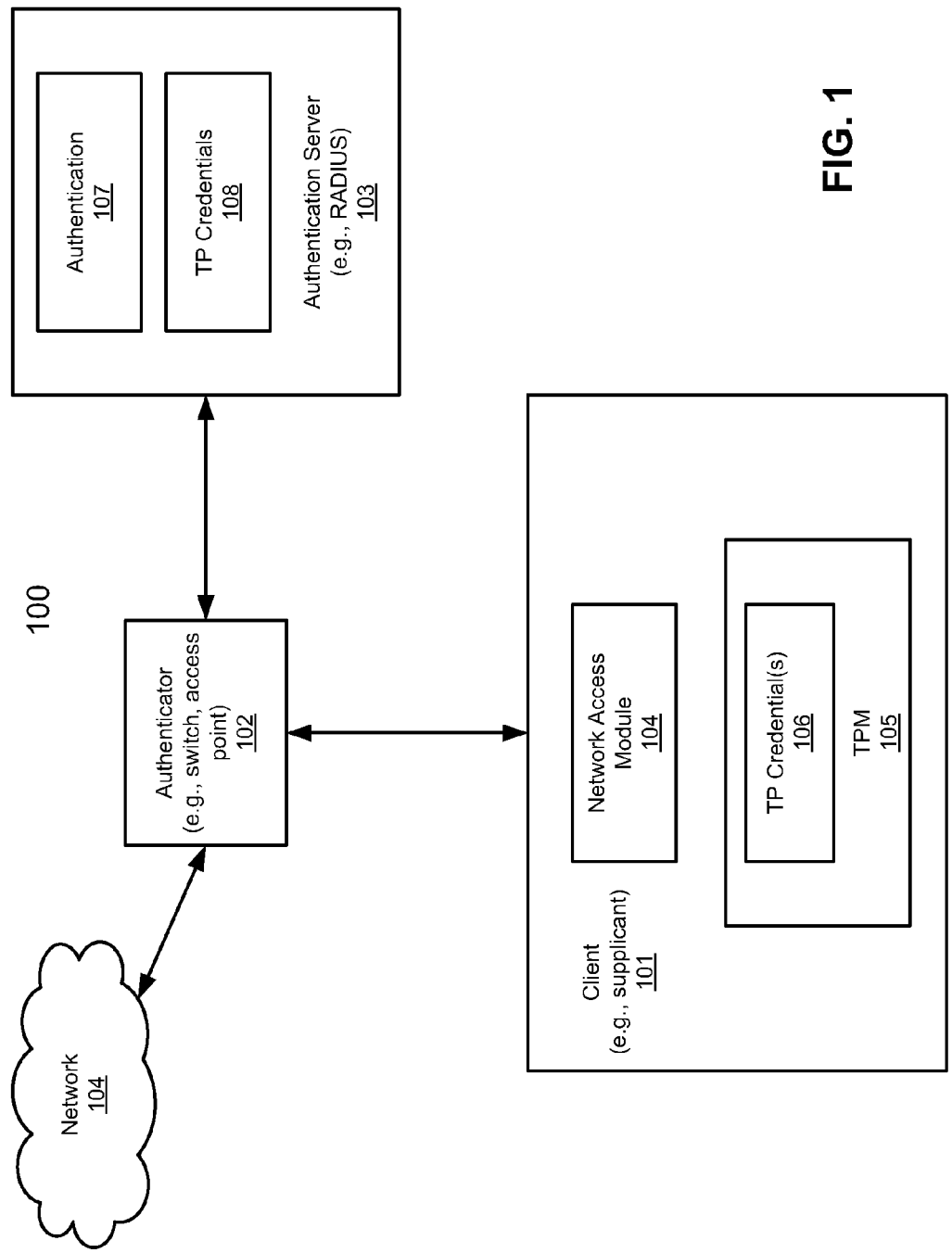
FIG. 1 is a block diagram illustrating a network system according to one embodiment of the invention.

In the following description, numerous details are set forth to provide a more thorough explanation of the embodiments of the present invention. It will be apparent, however, to one skilled in the art, that embodiments of the present invention may be practiced without these specific details. In other instances, well-known structures and devices are shown in block diagram form, rather than in detail, in order to avoid obscuring embodiments of the present invention.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification do not necessarily all refer to the same embodiment.

According to some embodiments, credentials generated by a TPM or a mobile TPM module of a client machine can be used to authenticate a user and/or the client machine (e.g., data processing system such as desktop, laptop, handheld device, etc.), when the user and/or client machine attempt to enter a network. Throughout this application, a TPM collectively represents any kind of trusted platform modules, including a mobile TPM, where a TPM module can be implemented using software, firmware, hardware, or a combination thereof. The credentials may be generated by measuring or capturing integrity of certain software and/or hardware installed in the client machine. In one embodiment, when a client machine enters a network, the client machine transmits one or more trusted platform (TP) credentials (also referred to as system integrity credentials) to an authentication entity for the purpose of authenticating the client machine. The one or more TP credentials may be embedded in an authentication packet to be transmitted to the authentication entity using a network access control (NAC) protocol, such as, for example, IEEE 802.1x compatible protocol. As a result, a user and/or client machine can be authenticated by the authentication entity based on integrity of the client machine, which is represented by one or more TP credentials, in order to enter a network that is controlled by the authentication entity. The TP credentials may be generated by a client system and stored and/or signed by a TPM module of the client system.

Under the IEEE 802.1x protocol, a network is configured in such a way as to make network communication impossible until a trusted management system "unlocks" a particular port to which a client machine is attached. In one embodiment, the IEEE 802.1x protocol is extended to encompass an additional extensible authentication protocol (EAP). This protocol requires that the client machine gathers (e.g., through a TPM module) a variable number of "metrics" which uniquely identify certain measured objects (e.g., hash sums of files or data, etc.) The measurements may be signed by a private key, which may be stored in the TPM module, to avoid tampering when transmitting over the network to the management system using the IEEE 802.1x protocol. After the management system successfully authenticates the client machine based on one or more metrics (e.g., TP credentials), the port may be unlocked to allow general network access by the client machine.

An embodiment of the invention identifies components of a client machine and validates the integrity of software during boot time of the client machine. In addition, rather than simply validating that the client machine is in possession of an authentication key, an embodiment of the invention provides additional security when the client machine enters a network.

FIG. 1 is a block diagram illustrating a network system according to one embodiment of the invention. Referring to FIG. 1, system 100 includes, but not limited to, a client 101 communicatively coupled to authenticator 102 to be authenticated by authenticator 102 and/or authentication server 103, in order to gain access to network 104. Client 101 may be any kind of computing devices, such as desktops, laptops, tablets, handheld devices (e.g., smartphones), or a combination thereof. Authenticator 102 may be a network gateway device, a network switch or router, or an access point (AP) of a wired and/or wireless network. Authentication server 103 may be a remote authentication and/or authorization server, such as, a remote authentication dial-in user service (RADUIS) server. Authenticator 102 and authentication server 103 may be separate entities (e.g., separate computer systems) and alternatively, they may be implemented as a single entity or server computer. Authenticator 102 may be a management server of an Enterprise while authentication server 103 may be a third-party authentication server. In one embodiment, client 101 includes one or more virtual machines (VMs), each corresponding to a guest operating system (OS), hosted by a host OS, also referred to as a hypervisor or virtual machine monitor (VMM). In one embodiment, authentication server 103 may be a virtualization management system, such as a virtualization server of a virtualization system available from Red Hat®, Inc. In this situation, the VMM may operate as pass through to authenticator 102 or alternatively, the VMM of client 101 may operate as an authenticator.

In one embodiment, client 101 is implemented as a trusted platform conforming to a trusted platform module specification defined by the Trusted Computing Group. Client 101 includes TPM module 105, which may be implemented in hardware, software, or a combination of both, having one or more TP credentialsTP credentials 106 stored therein. TP credentialsTP credentials 106 may be measured or recorded as metrics and stored in the TPM module (e.g., during an initialization process such boot time or dynamically at runtime) of client 101. According to one embodiment, TP credentials 106 may be used by authentication server 103 to authenticate client 101 when client 101 enters network 104, which may be a local area network (LAN) or a wide area network (WAN), wired or wireless.

TPM 105 offers facilities for the secure generation of cryptographic keys, and limitation of their use, in addition to a hardware pseudo-random number generator. It also includes capabilities such as remote attestation and sealed storage. "Remote attestation" creates a nearly unforgeable hash key summary of the hardware and software configuration. The extent of the summary of the software is decided by the program encrypting the data. This allows a third party to verify that the software has not been changed. "Binding" encrypts data using the TPM endorsement key, a unique RSA key burned into the TPM chip during its production, or another trusted key descended from it. "Sealing" encrypts data similar to binding, but in addition specifies a state in which the TPM must be in order for the data to be decrypted (unsealed).

A TPM can be used to authenticate hardware devices. Since each TPM chip has a unique and secret RSA key burned in as it is produced, it is capable of performing platform authentication. For example, it can be used to verify that a system (e.g., client 101) seeking access (to authenticator 102) is the expected system. Trust is the expectation that a device will behave in a particular manner for a specific purpose. A trusted platform may provide at least one of basic features: protected capabilities, integrity measurement, and integrity reporting.

Protected capabilities are a set of commands with exclusive permission to access shielded locations. Shielded locations are places (e.g., memory, register, etc.) where it is safe to operate on sensitive data; data locations that can be accessed only by protected capabilities. Attestation is the process of vouching for the accuracy of information. External entities can attest to shielded locations, protected capabilities, and roots of trust.

Integrity measurement is the process of obtaining metrics of platform characteristics that affect the integrity (trustworthiness) of a platform and putting digests of those metrics in platform configuration registers (PCRs), which may be implemented as in volatile or non-volatile storage. The starting point of measurement is referred to as the root of trust for measurement. A static root of trust for measurement begins measuring from a well-known starting state such as a power on self-test. A dynamic root of trust for measurement transitions from an un-trusted state to one that is trusted. Integrity reporting is the process of attesting to integrity measurements recorded in PCRs.

Measurement data describe properties and characteristics of the measured components (e.g., hardware and/or software components). It is the responsibility of the measurement kernel implementer to understand the syntax and semantics of measured fields in sufficient detail to produce an encoding suitable for measurement event consumers. Verification of measurement events requires recreation of the measurement digest and a simple comparison of digest values (using PCR value as one of the comparator). Further detailed information concerning a TPM can be found in article entitled "TCG Specification Architecture Overview", Rev. 1.4, published in 2007, which is incorporated by reference herein in its entirety. Again, it will be appreciated that a TPM module can be implemented in software, firmware, hardware, or a combination thereof. A TPM module can be implemened in software completely and executed in a random-access memory (RAM) of client 101. Such a software-imploemented TPM may operate according to at least a portion of the TCG specification set forth above. The keys and other confidential information associated with the TPM module can be stored in a secured storage location of a storage device almost exclusively accessed by the TPM module.

Referring back to FIG. 1, in one embodiment, TP credentials 106 are referred to those credential data measured or recorded and stored in a secured storage location of TPM module 105 such as PCRs of TPM module 105 or some other secured storage locations in a storage device of client 101. TP credentials 106 may include at least one of endorsement credential, conformance credential, platform credential, validation credential, and identity credential set forth in the above TPM specification.

According to one embodiment, when client 101 attempts entering network 104, network access module 104 retrieves one or more of TP credentials 106 from TPM 105 and transmits the TP credentials to authentication server 103 (optionally via authenticator 102) for the purposes of being authenticated by authentication server 103. In response to one or more TP credentials received from client 101, authentication module 107 of authentication server 103 is configured to authenticate the received TP credentials in view of locally generated TP credentials 108. If the received one or more TP credentials match the counterparts of TP credentials 108, client 101 may be authenticated successfully and the associated port of authenticator 102 may be unlocked to allow client 101 access network 104 via the unlocked port. Otherwise, the access may be denied. In one embodiment, TP credentials used for authentications may be exchanged using a network access control protocol such as the IEEE 802.1x protocol.

The IEEE 802.1x standard offers an additional method for controlling network access utilizing port control. Port-based network access control makes use of the physical access characteristics of an IEEE 802 LAN infrastructure in order to provide a means of authenticating and authorizing devices attached to a switch port that has point-to-point connection characteristics. IEEE 802.1x authentication involves three parties: a supplicant, an authenticator, and an authentication server. The supplicant is a client device (such as a laptop) that wishes to attach to the LAN or wireless LAN (WLAN)—though the term "supplicant" is also used interchangeably to refer to the software running on the client that provides credentials to the authenticator. The authenticator is a network device, such as an Ethernet switch or wireless access point; and the authentication server is typically a host running software supporting the RADIUS and EAP protocols.

The authenticator acts like a security guard to a protected network. The supplicant (i.e., client device) is not allowed access through the authenticator to the protected side of the network until the supplicant's identity has been validated and authorized. With IEEE 802.1x port-based authentication, the supplicant provides credentials, such as user name/password or digital certificate, to the authenticator, and the authenticator forwards the credentials to the authentication server for verification. If the authentication server determines the credentials are valid, the supplicant (client device) is allowed to access resources located on the protected side of the network.

On detection of a new supplicant, the port on the switch (e.g., authenticator) is enabled and set to the "unauthorized" state. In this state, only the IEEE 802.1X traffic is allowed; other traffic, such as dynamic host configuration protocol (DHCP) and hypertext transfer protocol (HTTP), is dropped. To initiate authentication the authenticator will periodically transmit EAP-Request Identity frames to a special layer-2 address on the local network segment. The supplicant listens on this address, and on receipt of the EAP-Request Identity frame it responds with an EAP-Response Identity frame containing an identifier for the supplicant such as a User ID. The authenticator then encapsulates this identity response in a RADIUS Access-Request packet and forwards it on to the authentication server. The supplicant may also initiate or restart authentication by sending an EAP over LAN (EAPOL)-Start frame to the authenticator, which will then reply with an EAP-Request Identity frame.

The authentication server sends a reply (encapsulated in a RADIUS Access-Challenge packet) to the authenticator, containing an EAP Request specifying the EAP method (e.g., the type of EAP based authentication it wishes the supplicant to perform). The authenticator encapsulates the EAP Request in an EAPOL frame and transmits it to the supplicant. At this point the supplicant can reject the requested EAP method and respond with the EAP methods it is willing to perform, or start the requested EAP Method.

If the authentication server and supplicant agree on an EAP Method, EAP Requests and Responses are sent between the supplicant and the authentication server (translated by the authenticator) until the authentication server responds with either an EAP-Success message (encapsulated in a RADIUS Access-Accept packet), or an EAP-Failure message (encapsulated in a RADIUS Access-Reject packet). If authentication is successful, the authenticator sets the port to the "authorized" state and normal traffic is allowed. If the authentication is unsuccessful the port remains in the "unauthorized" state. When the supplicant logs off, it sends an EAPOL-logoff message to the authenticator, the authenticator then sets the port to the "unauthorized" state, once again blocking all non-EAP traffic. Further detailed information concerning the IEEE 802.1X protocol can be found in the IEEE standard for local and metropolitant area networks, entitled "Port-Based Network Access Control", published in 2004, which is incorporated by reference herein in its entirety. Further detailed information concerning the EAP protocol can be found in Request for Comments (RFC) 3748, entitled "Extensible Authentication Protocol", which is incorporated by reference herein in its entirety.

Referring back to FIG. 1, in one embodiment, client 101 operates as a supplicant and the TP credentials are embedded within EAP packets (e.g., EAP Response packets) to be transmitted, using IEEE 802.1x protocol, to authentication server 103 (possibly via authenticator 102) for the purposes of being authenticated by authentication server 103, which may also be an authentication, authorization, and accounting (AAA) server. Based on the TP credentials, authentication server 103 is configured to authenticate client 101 to determine whether client 101 is entitled to access network 104.

Figure 2:
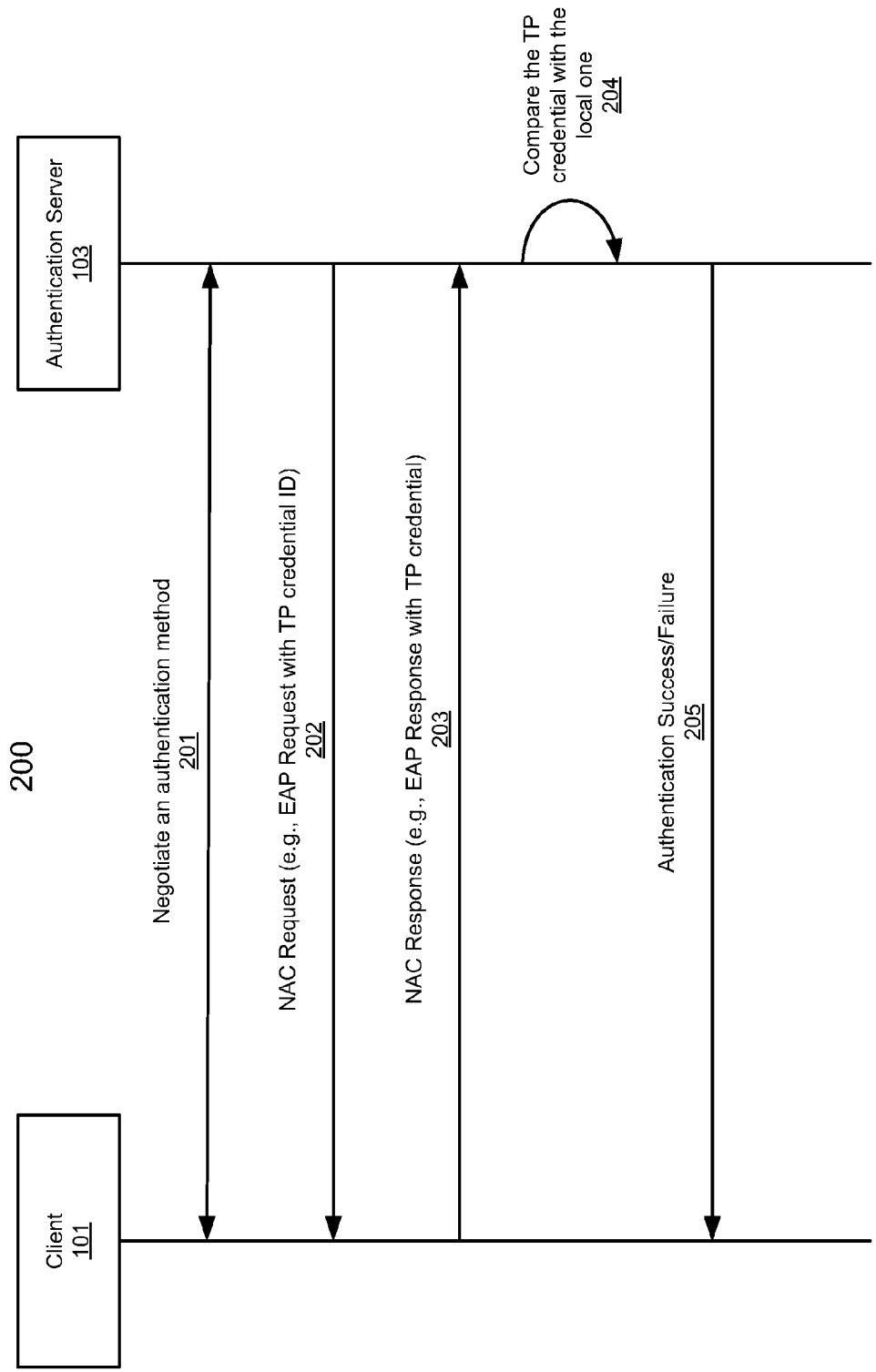
FIG. 2 is a flow diagram illustrating an authentication method according to one embodiment of the invention.

FIG. 2 is a flow diagram illustrating an authentication method according to one embodiment of the invention. For example, method 200 may be performed between client 101 and authentication server 103 (optionally via authenticator 102) of FIG. 1. Referring to FIG. 2, during transaction 201, client 101 and authentication server 103 negotiate an authentication method. Once they agree upon a particular authentication method, during transaction 202, authentication server 103 transmits a NAC request, such as an EAP Request packet, to client 101 using a NAC protocol such as IEEE 802.1x protocol. The request may include an identifier that identifies a particular TP credential. In response during transaction 203, client 101 transmits a NAC response, such as EAP Response, having the requested TP credential embedded therein to authentication server 103. During transaction 204, client 101 is authenticated by authentication server 103 based on the received TP credential. For example, the received TP credential may be compared with the one locally generated at authentication server 103 to determine whether they are matched. Based on a result of the authentication, at transaction 205, a success or failure message (e.g., EAP-success or EAP-failure) is transmitted from authentication server 103 to client 101.

Figure 3:
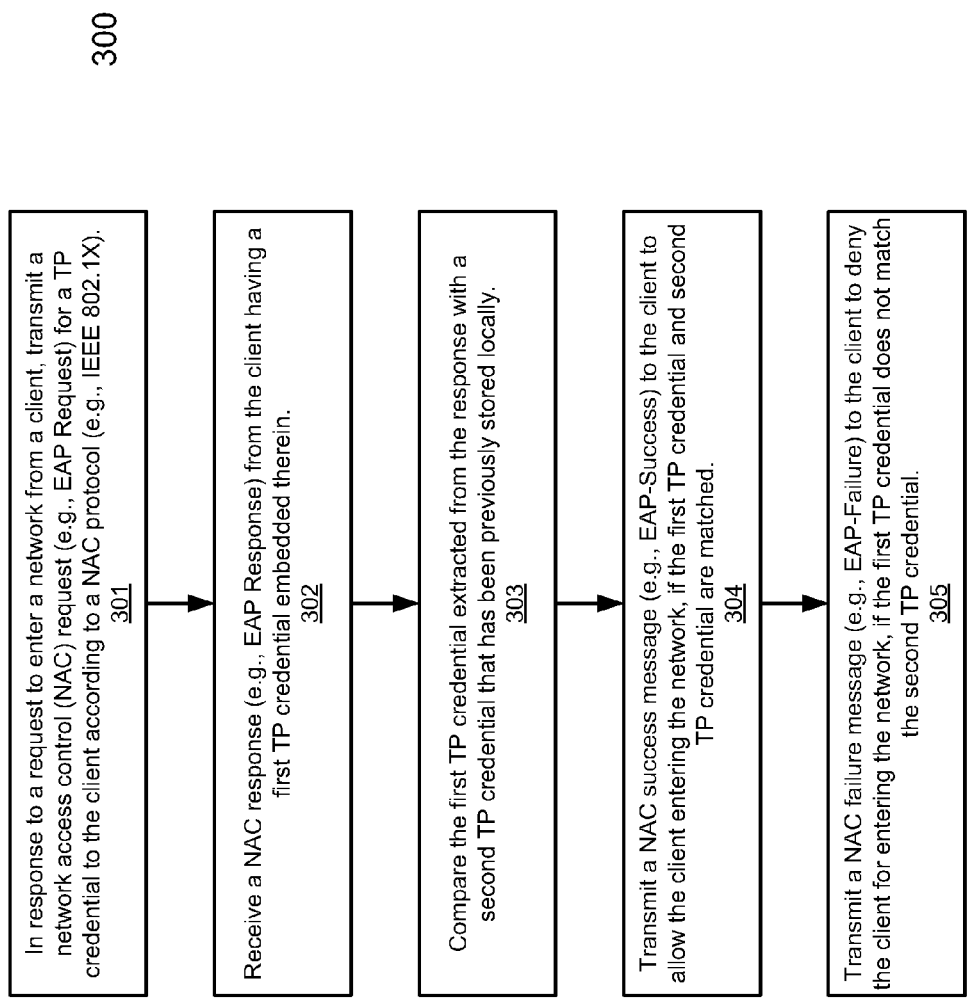
FIG. 3 is a flow diagram illustrating a method for authenticating a client according to one embodiment of the invention.

FIG. 3 is a flow diagram illustrating a method for authenticating a client according to one embodiment of the invention. For example, method 300 may be performed by authentication server 103 of FIG. 1. Referring to FIG. 3, in response to a request to enter a network from a client, at block 301, a NAC request, such as an EAP Request, is transmitted from an authentication server to the client requesting a TP credential using a NAC protocol such as IEEE 802.1x protocol. At block 302, a NAC response, such as an EAP Response, is received from the client, where the NAC response includes a first TP credential embedded therein. At block 303, the first TP credential is compared with a second TP credential that has been previously generated and/or stored locally. At block 304, a NAC success message (e.g., EAP-Success) is transmitted to the client if both the first TP credential and second TP credential are matched. Otherwise at block 305, a NAC failure message (e.g., EAP-Failure) message is transmitted to the client.

Figure 4:
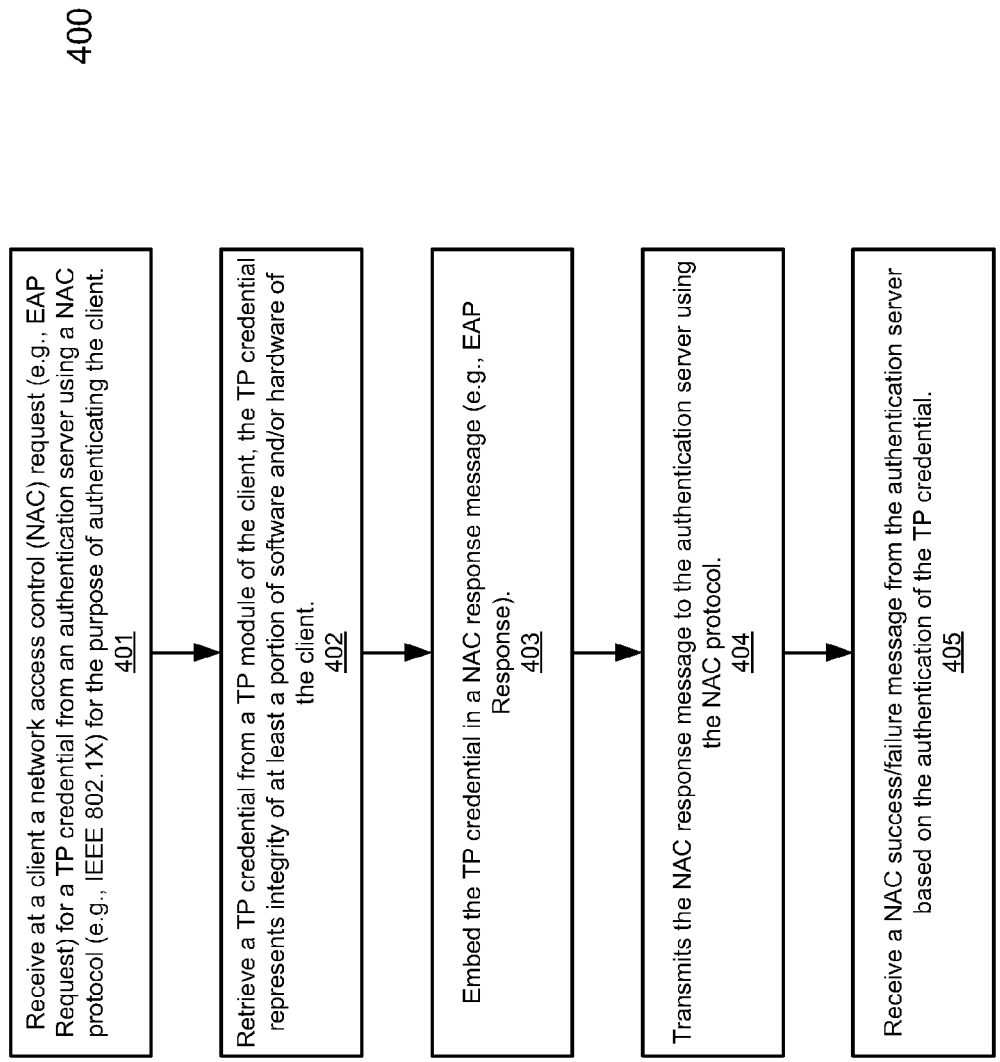
FIG. 4 is a flow diagram illustrating a method for authenticating a client according to another embodiment of the invention.

FIG. 4 is a flow diagram illustrating a method for authenticating a client according to another embodiment of the invention. For example, method 400 may be performed by client 101 of FIG. 1. Referring to FIG. 4, at block 401, a client receives a NAC request (e.g., EAP Request) from an authentication server for a TP credential using a NAC protocol (e.g., IEEE 802.1x protocol) for the purposes of authenticating the client to access a network. In response to the request, at block 402, a TP credential is identified based on the request and retrieved from a TPM module of the client, where the TP credential represents integrity of at least a portion of software and/or hardware of the client. At block 403, the TP credential is embedded in a NAC response message such as an EAP Response message and at block 404, the NAC response message is transmitted from the client to the authentication server using a NAC protocol such as IEEE 802.1x protocol. At block 405, a NAC success or failure message is received from the authentication server based on the authentication of the TP credential.

According to some embodiments, the techniques described above can also be applied to a client having a virtualized operating environment. A client may include one or more virtual operating environments such as virtual machines (VMs) operating therein. Each VM may maintain its own TP credential (e.g., by a virtual TPM module) and may be individually authenticated by an authentication server based on the authentication of the corresponding TP credential (e.g., virtual TP credential), which may be exchanged using a NAC protocol such as IEEE 802.1x protocol. As a result, the VMs can be isolated for security purposes.

Figure 5:
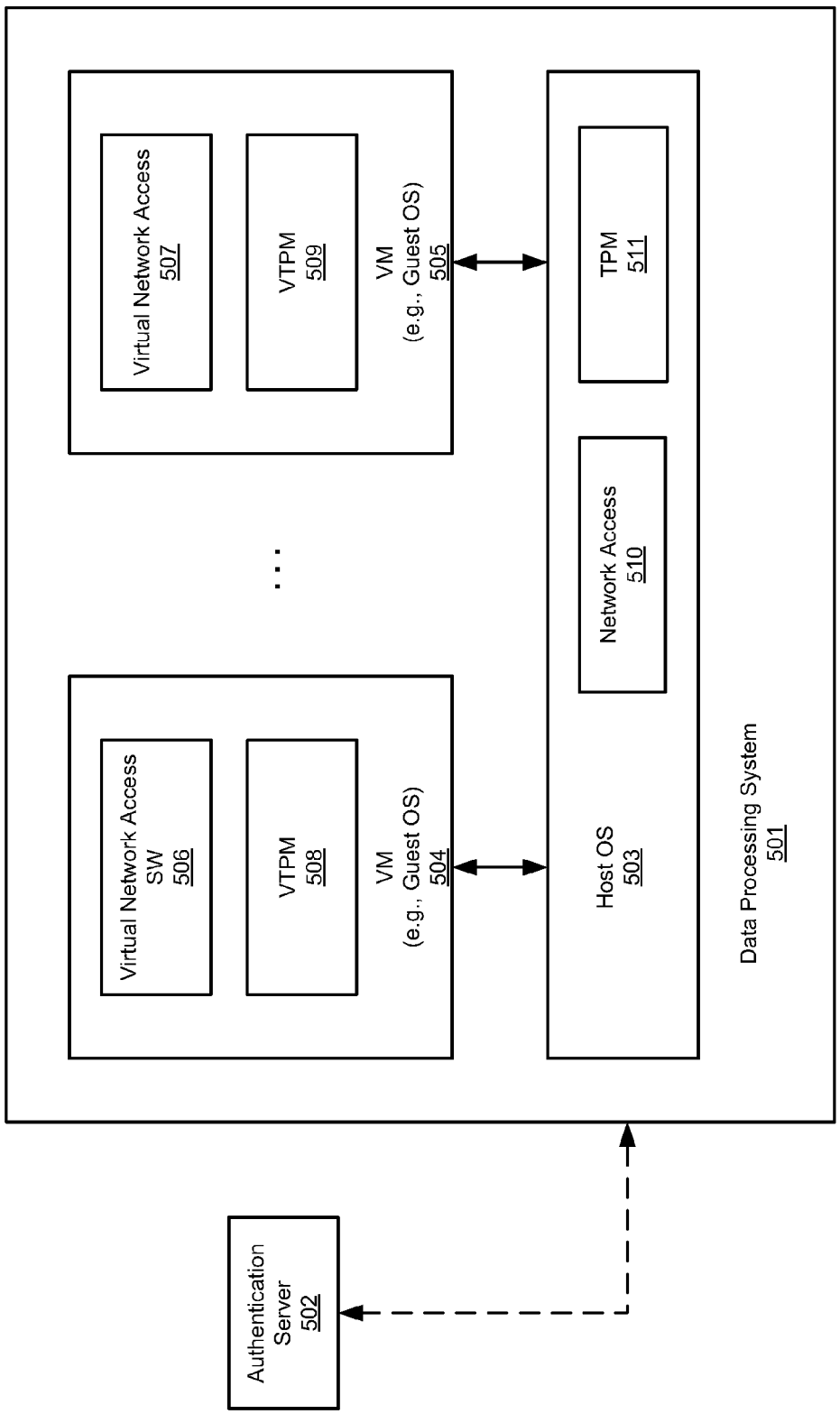
FIG. 5 is a block diagram illustrating a virtualized system according to one embodiment of the invention.

FIG. 5 is a block diagram illustrating a virtualized system according to one embodiment of the invention. For example, system 501 may represent client 101 while system 502 may represent authenticator 102 and/or authentication server 103 of FIG. 1. Referring to FIG. 5, system 501 includes one or more virtual machines 504-505, which can be implemented in a form of a guest OS, hosted by a host OS 503. Each of VMs 504-505 can host an application (e.g., network access software 506-507). Multiple guest OSes (e.g., guest OSes 504-505) and the associated virtual machines may be controlled by host OS 503. System 501 may be communicatively coupled to authentication server 502 (optionally via an authenticator), which may be a management server such as a virtualization management server.

Typically, a host OS represents a virtual machine monitor (VMM) (also referred to as a hypervisor) for managing the hosted virtual machines. A guest OS may be of the same or different types with respect to the host OS. For example, a guest OS may be a Windows® operating system from Microsoft® Corporation of Redmond, Wash. and a host OS may be a LINUX® operating system available from Red Hat, Inc. of Raleigh, N.C. A virtual machine can be any type of virtual machines, such as, for example, hardware emulation, full virtualization, para-virtualization, and operating system-level virtualization virtual machines. Different virtual machines hosted by a server may have the same or different privilege levels for accessing different resources.

According to one embodiment, host OS 503 includes, but not limited to, network access module 510 and a TPM module 511. TPM module 511 may represent a TPM chip available from a variety of vendors. Alternatively, TPM module 511 may be a software-implemented module or a combination of software and hardware. When host OS 503 enters a network, network access software 510 transmits one or more TP credentials retrieved from TPM module 511 to authentication server 502 to be authenticated by authentication server 502. Once host OS 503 has been authenticated by authentication server 502, certain components of host OS 503 can access the network. Similarly, each of VMs 504-505 includes, not limited to, network access module 506-507 and a virtual TPM module (e.g., VTPMs 508-509) to allow each of the VMs 504-505 to be individually and independently authenticated by authentication server 502 based on their respective TP credentials retrieved from their respective VTPM modules 508-509. In one embodiment, the network connection may be provided to guests 504-505 virtually via a software bridge which may be implemented in the kernel of host OS 503. In this situation, the network access control protocol such as IEEE 802.1X may be shuttled across the software bridge such that each VM guest can be independently authenticated.

According to one embodiment, VTPM 504-505 may be implemented as a virtual instance which may be spawned from a base virtual TPM module (not shown). Alternatively, a VTPM may be derived from TPM 511. A TPM may include a common portion of components that are common to all TPMs 508-509 and 511, and a specific portion that represents certain specific characteristics and/or integrity of its respective VM or OS. Note that although TPM 511 may be implemented in a hardware TPM chip (not shown), each of the VTPM 504-505 may be stored in a specific or secured storage associated with its VM (not shown), either volatile (e.g., random-access memory or RAM) or non-volatile (e.g., hard drive). In this embodiment, certain security measures should be in place for accessing the VTPMs.

Figure 6:
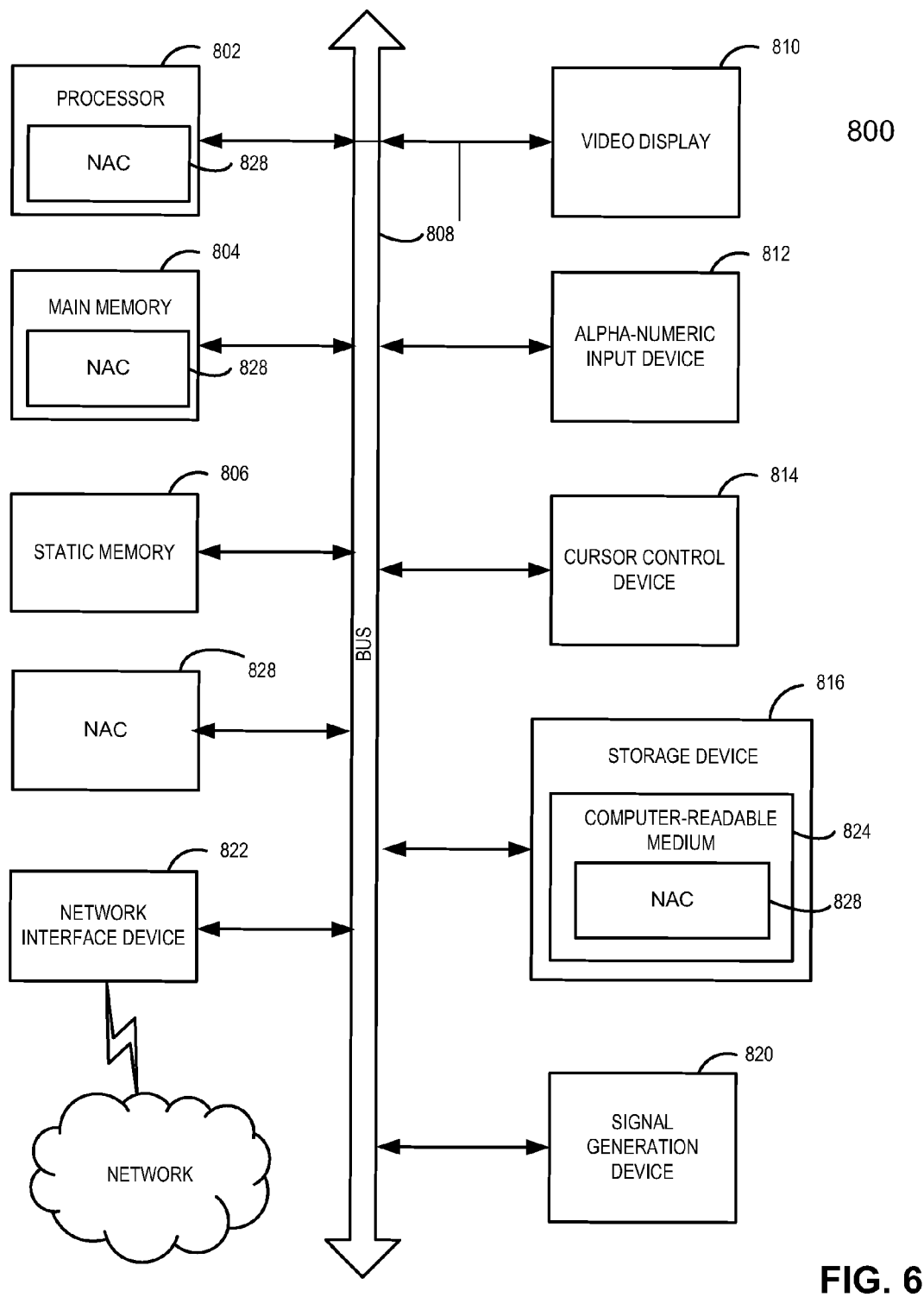
FIG. 6 illustrates a data processing system which may be used with an embodiment of the invention.

FIG. 6 illustrates a data processing system which may be used with an embodiment of the invention. For example, system 800 may represent a client system, an authenticator, and/or an authentication server as described above. Referring to FIG. 6, system 800 may present a diagrammatic representation of a machine in the exemplary form of a computer system within which a set of instructions, for causing the machine to perform any one or more of the methodologies discussed herein, may be executed. In alternative embodiments, the machine may be connected (e.g., networked) to other machines in a LAN, an intranet, an extranet, and/or the Internet.

The machine may operate in the capacity of a server or a client machine in client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 800 includes a processor 802, a main memory 804 (e.g., read-only memory (ROM), flash memory, dynamic random access memory (DRAM) such as synchronous DRAM (SDRAM), etc.), a static memory 806 (e.g., flash memory, static random access memory (SRAM), etc.), and a data storage device 816, which communicate with each other via a bus 808.

Processor 802 represents one or more general-purpose processors such as a microprocessor, a central processing unit, or the like. More particularly, the processor may be complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 802 may also be one or more special-purpose processors such as an application specific integrated circuit (ASIC), a field programmable gate array (FPGA), a digital signal processor (DSP), network processor, or the like. The processor 802 is configured to execute the instructions 828 for performing the operations and steps discussed herein.

The computer system 800 may further include a network interface device 822. The computer system 800 also may include a video display unit 810 (e.g., a liquid crystal display (LCD) or a cathode ray tube (CRT)), an alphanumeric input device 812 (e.g., a keyboard), a cursor control device 814 (e.g., a mouse), and a signal generation device 820 (e.g., a speaker).

The data storage device 816 may include a computer-accessible storage medium 824 (also known as a machine-readable storage medium or a computer-readable medium) on which is stored one or more sets of instructions or software (e.g., NAC and/or authentication module 828) embodying any one or more of the methodologies or functions described herein. The NAC and/or authentication module 828 may also reside, completely or at least partially, within the main memory 804 and/or within the processor 802 during execution thereof by the computer system 800, the main memory 804 and the processor 802 also constituting machine-accessible storage media. The NAC and/or authentication module 828 may further be transmitted or received over a network via the network interface device 822.

The computer-readable storage medium 824 may also be used to store the desktop 101 persistently. While the computer-readable storage medium 824 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of the present invention. The term "computer-readable storage medium" shall accordingly be taken to include, but not be limited to, solid-state memories, and optical and magnetic media.

The modules 828, components and other features described herein can be implemented as discrete hardware components or integrated in the functionality of hardware components such as ASICS, FPGAs, DSPs or similar devices. In addition, the modules 828 can be implemented as firmware or functional circuitry within hardware devices. Further, the modules 828 can be implemented in any combination hardware devices and software components.

In the above description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the invention also relate to an apparatus for performing the operations herein. Such a computer program is stored in a non-transitory computer readable medium. A machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments of the present invention are not described with reference to any particular programming language. It will be appreciated that a variety of programming languages may be used to implement the teachings of embodiments of the invention as described herein.

In the foregoing specification, embodiments of the invention have been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A method comprising:

in response to a request received at an authentication server comprising a processor from a client entering a network, transmitting by the authentication server a network access control (NAC) request to the client using a NAC protocol, wherein the NAC request is compatible with a first extensible authentication protocol (EAP) method, the NAC request comprising an identifier (ID) identifying a trusted platform (TP) credential that represents integrity of at least a portion of software and hardware configurations of the client, wherein the client represents a host operating system (OS) hosting a guest OS representing a virtual machine comprising a virtual trusted platform module (VTPM), the VTPM spawned from a base trusted platform module, and wherein a network connection is provided to the guest OS virtually via a software bridge implemented in a kernel of the host OS;

receiving, at the authentication server, a NAC response from the client, the NAC response comprising a first TP credential embedded therein and a different EAP method;

in response to the NAC response, the processor of the authentication server comparing the first TP credential with a second TP credential stored in a storage associated with the authentication server;

allowing, by the authentication server, the client to enter the network when the first and second TP credentials are matched using the different EAP method; and denying, by the authentication server, the request of the client to enter the network when the first TP credential does not match the second TP credential using the different EAP method.

2. The method of claim 1, wherein the TP credential is retrieved from a trusted platform module (TPM) of the client, and wherein the TPM module is implemented in at least one of software or hardware compatible with a TPM specification set forth by a trusted computing group (TCG) standard body.

3. The method of claim 2, wherein the TP credential comprises at least one of endorsement credential, conformance credential, platform credential, validation credential, or identity credential specified in the TPM specification.

4. The method of claim 1, wherein the NAC protocol is compatible with an Institute of Electrical and Electronics Engineers (IEEE) 802.1X protocol.

5. The method of claim 4, wherein the NAC request message is compatible with an Extensible Authentication Protocol (EAP) method REQUEST message, and wherein the ID of the requested TP credential is specified within the EAP method REQUEST message.

6. The method of claim 5, wherein the NAC response message is compatible with an EAP method RESPONSE message, and wherein the first TP credential is embedded within the EAP method RESPONSE message.

7. The method of claim 1, wherein the TP credential represents integrity of at least a portion of the host OS and software hosted by the host OS.

8. The method of claim 1, wherein the TP credential represents integrity of at least a portion of the guest OS and software hosted by the guest OS.

9. A non-transitory computer-readable storage medium having instructions stored therein, which when executed by a processor, cause the processor to execute operations comprising:
  in response to a request received at an authentication server comprising the processor from a client entering a network, transmitting by the authentication server a network access control (NAC) request to the client using a NAC protocol, wherein the NAC request is compatible with a first extensible authentication protocol (EAP) method, the NAC request comprising an identifier (ID) identifying a trusted platform (TP) credential that represents integrity of at least a portion of software and hardware configurations of the client, wherein the client represents a host operating system (OS) hosting a guest OS representing a virtual machine comprising a virtual trusted platform module (VTPM), the VTPM spawned from a base trusted platform module, and wherein a network connection is provided to the guest OS virtually via a software bridge implemented in a kernel of the host OS;
  receiving, at the authentication server, a NAC response from the client, the NAC response comprising a first TP credential embedded therein and a different EAP method;
  in response to the NAC response, the processor of the authentication server comparing the first TP credential with a second TP credential stored in a storage associated with the authentication server;
  allowing, by the authentication server, the client entering the network when the first and second TP credentials are matched using the different EAP method; and
  denying, by the authentication server, the client entering the network when the first TP credential does not match the second TP credential using the different EAP method.

10. The non-transitory computer-readable storage medium of claim 9, wherein the TP credential is retrieved from a trusted platform module (TPM) of the client, and wherein the TPM module is implemented in at least one of software or hardware compatible with a TPM specification set forth by a trusted computing group (TCG) standard body.

11. The non-transitory computer-readable storage medium of claim 10, wherein the TP credential comprises at least one of endorsement credential, conformance credential, platform credential, validation credential, or identity credential specified in the TPM specification.

12. The non-transitory computer-readable storage medium of claim 9, wherein the NAC protocol is compatible with an Institute of Electrical and Electronics Engineers (IEEE) 802.1X protocol.

13. The non-transitory computer-readable storage medium of claim 12, wherein the NAC request message is compatible with an Extensible Authentication Protocol (EAP) method REQUEST message, and wherein the ID of the requested TP credential is specified within the EAP method REQUEST message.

14. The non-transitory computer-readable storage medium of claim 13, wherein the NAC response message is compatible with an EAP method RESPONSE message, and wherein the first TP credential is embedded within the EAP method RESPONSE message.

15. The non-transitory computer-readable storage medium of claim 9, wherein the TP credential represents integrity of at least a portion of the host OS and software hosted by the host OS.

16. The non-transitory computer-readable storage medium of claim 9, wherein the TP credential represents integrity of at least a portion of the guest OS and software hosted by the guest OS.

17. A method comprising:
  receiving, by a processor of a client, a network access control (NAC) request from an authentication server using a NAC protocol for authenticating the client, the NAC request comprising an identifier (ID) identifying a trusted platform (TP) credential that represents integrity of at least a portion of software and hardware configurations of the client, wherein the NAC request is compatible with a first extensible authentication protocol (EAP) method, wherein the client represents a host operating system (OS) hosting a guest OS representing a virtual machine comprising a virtual trusted platform module (VTPM), the VTPM spawned from a base trusted platform module, and wherein a network connection is provided to the guest OS virtually via a software bridge implemented in a kernel of the host OS;
  in response to the NAC request, retrieving a first TP credential from a TPM module of the client in view of the ID extracted from the NAC request;
  transmitting a NAC response to the authentication server, the NAC response comprising the first TP credential embedded therein and a different EAP method; and
  receiving a result from the authentication server indicating whether the client has been successfully authenticated, wherein the first TP credential is used by the authentication server to compare against a second TP credential stored in a storage associated with the authentication server to determine whether the client is entitled to enter the network using the different EAP method.

18. The method of claim 17, wherein the TPM module is compatible with a TPM specification set forth by a trusted computing group (TCG) standard body, and wherein the TP credential comprises at least one of endorsement credential, conformance credential, platform credential, validation credential, or identity credential specified in the TPM specification.

19. The method of claim 17, wherein the NAC protocol is compatible with an Institute of Electrical and Electronics Engineers (IEEE) 802.1X protocol, wherein the NAC request message is compatible with an Extensible Authentication Protocol (EAP) method REQUEST message, wherein the ID of the requested TP credential is specified within the EAP method REQUEST message, wherein the NAC response message is compatible with an EAP method RESPONSE message, and wherein the first TP credential is embedded within the EAP method RESPONSE message.

20. The method of claim 17, wherein the TP credential represents integrity of at least a portion of the host OS and software hosted by the host OS.

21. The method of claim 17, wherein the TP credential represents integrity of at least a portion of the guest OS and software hosted by the guest OS.

* * * * *